Dec. 9, 1930.   A. DEVITO   1,784,419
BICYCLE MECHANISM
Filed Sept. 24, 1928
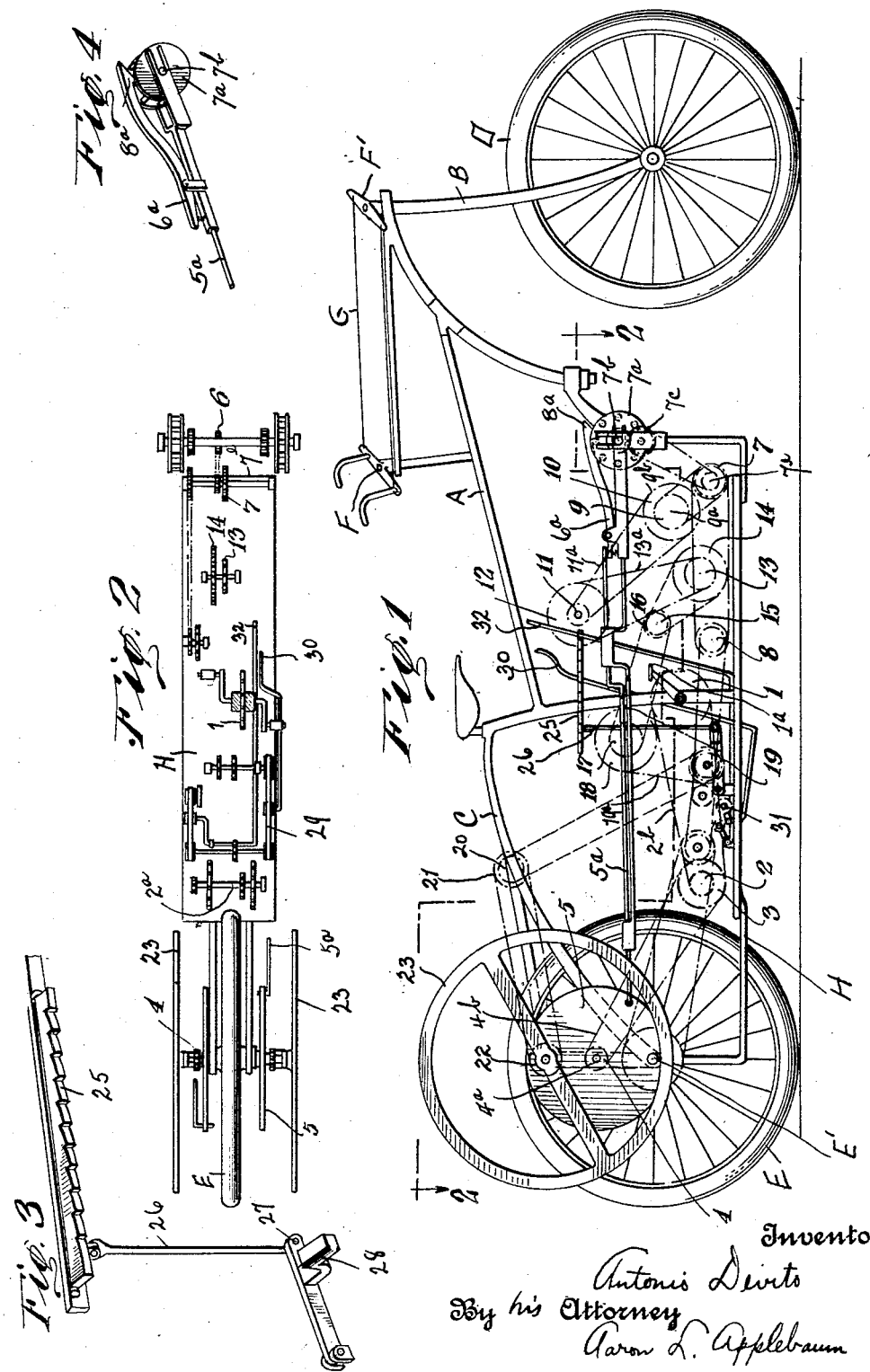

Patented Dec. 9, 1930

1,784,419

UNITED STATES PATENT OFFICE

ANTONIO DEVITO, OF BROOKLYN, NEW YORK

BICYCLE MECHANISM

Application filed September 24, 1928. Serial No. 308,088.

This invention relates to bicycles and more particularly to the driving mechanism whereby the rear ground wheel may be driven through a system of pedal operated gearing.

One of the objects of my invention is to provide a system of gearing in a bicycle mechanism in which power may be communicated to a drive wheel and the speed controlled by a series of shift levers.

Another object of my invention is to provide a gearing mechanism for bicycles including a system of sprocket and chain drives from a main foot operated sprocket for driving a pair of fly wheels associated with the rear ground wheel so that the mechanism may continue to operate for a long period of time upon a single rotation of the main sprocket.

To enable others skilled in the art to more fully understand the invention, reference is had to the accompanying drawing wherein Fig. 1 is a side view.

Fig. 2 is a plan taken on the line 2—2 of Fig. 1.

Fig. 3 is a detail of a foot brake.

Fig. 4 is a detail of a part of the reciprocating mechanism for operating the rear wheels.

Referring to the drawings, A designates the main bicycle frame having a front fork B and rear fork C supporting the front steering wheel and rear ground wheel D, E respectively. A pivoted cross bar F provided with handles is connected to a second pivoted cross bar F' on the upper end of the fork B by means of lines G whereby the front steering wheel may be operated. The rear ground wheel E is mounted on a shaft E' which also supports an under slung platform H.

The main frame is provided with a sprocket 1 operated by foot pedals 1a which drives a small sprocket 2 on a sprocket shaft 2a by means of a sprocket chain 2b. The shaft 2a has keyed thereto outside sprockets 3 which drive stub shafts 4a through sprocket chains 4b. The stub shafts 4a are each provided with a disk 5 located on each side of the rear ground wheel E.

Connected to each of the disks 5 is a reciprocating rod 5a having a front pivoted lever 6a cooperating with a toothed wheel 7a on a shaft 7b. The wheels 7a are each equipped with pins cooperating with the notched end 8a of the pivoted lever 6a so as to rotate the wheels 7a and the shaft counter-clockwise.

The shaft 7b carries a gear that meshes with a lower, smaller gear 6, and also a sprocket 7c that drives a sprocket 7d by a sprocket chain, the sprocket 7c being on a shaft 7e. On the shaft 7e is a sprocket 7 that drives sprocket 9 on shaft 9a by a sprocket chain 9b. A sprocket 10 on shaft 9a drives a small sprocket 11 by a sprocket chain 11a. The small sprocket 11 is mounted on the same shaft with a larger sprocket 12 which drives sprocket 13 by a sprocket chain 13a. The sprocket 13 is mounted on the same shaft with a larger sprocket 14 which drives sprockets 15, 16, 17 and 18 through similar sprocket chains. The sprocket 18 communicates its power to a bottom sprocket 19 by a sprocket chain 19a and which drives sprockets 20, 21 and 22, the sprockets 22 driving a large fly wheel 23.

The operation of the disks and energy imparted to the fly wheels through the sprocket and chain mechanism permits the rear wheel to be rotated for a long period of time with a single rotation of the foot pedals. The mechanism also provides for a notched rack bar 25 having a depending rod 26 pivotally connected thereto at one end, said rod being pivotally connected as at 27 to a foot brake 28 cooperating with a belt 29. A shift arm 30 cooperates with the notched rack bar and is adapted to actuate a shift roller 31 to control the speed of the belt passing over roller 8. A second shift arm 32 cooperates with and controls the speed of the belt 19a passing over roller 18. The shaft arms are adapted to be successively brought into engagement with or out of engagement with the belts to control the speed of the gearing.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention, what I claim as new and desire to secure by Letters Patent is:

1. In a bicycle having front and rear supporting wheels, a sprocket, a train of gearing operable from the sprocket, a pair of rotary disks on each side of the rear wheel driven by said gearing, a pair of reciprocating rods connected to the disks, and fly wheels located outside the said disks including gearing for operating the same and maintain the bicycle in motion.

2. In a bicycle having front and rear supporting wheels, a pedal operated sprocket, a train of gearing operable from the sprocket, a pair of rotary disks on each side of the rear wheel driven by said gearing, reciprocating rods connected to the disks, and fly wheels located outside the said disks including gearing for operating the same to maintain the bicycle in motion and a series of shift levers for controlling the speed of said gearing.

3. In a bicycle having a frame and front and rear supporting wheels, a suspended platform carried by the frame, a pedal operated sprocket, a train of gearing supported by the platform and operable by the sprocket, a pair of rotary disks on each side of the rear wheel, said disks being driven by the said gearing, a pair of reciprocating rods connected to the disks and alternately driven thereby, a pair of large fly wheels located outside the disks and mounted in a plane above the disks and rear wheel for maintaining the rear wheel in motion, and shift levers for controlling the speed of said gearing.

In testimony whereof I affix my signature.

ANTONIO DEVITO.